United States Patent [19]

Morser et al.

[11] Patent Number: 5,164,720
[45] Date of Patent: Nov. 17, 1992

[54] INTERFACE CIRCUITS FOR ELECTROMAGNETIC POSITION TRANSDUCERS

[75] Inventors: Alfred H. Morser, Cincinnati; Thomas E. Nead, Loveland, both of Ohio

[73] Assignee: Cincinnati Milacron Inc., Cincinnati, Ohio

[21] Appl. No.: 563,480

[22] Filed: Aug. 6, 1990

[51] Int. Cl.⁵ .............................................. G08C 19/12
[52] U.S. Cl. ............................... 340/870.310; 73/1 E; 318/653; 340/870.3
[58] Field of Search ....................... 340/870.37, 870.31, 340/870.34, 870.3; 73/1 D, 1 E, 1 R; 318/653, 661; 324/233, 234, 207.16, 207.17, 207.25

[56] References Cited

U.S. PATENT DOCUMENTS

| 2,708,718 | 5/1955 | Weiss | 340/870.25 |
|---|---|---|---|
| 3,967,064 | 6/1976 | Sigworth | 340/870.31 |
| 4,207,505 | 6/1980 | Falck et al. | 318/595 |
| 4,270,061 | 5/1981 | Gronner et al. | 307/270 |
| 4,270,077 | 5/1981 | Swartz et al. | 318/661 |
| 4,442,696 | 4/1984 | Erickson | 73/1 E |
| 4,712,106 | 12/1987 | McNally | 340/870.04 |
| 4,998,103 | 3/1991 | Rosswurm | 340/870.37 |

OTHER PUBLICATIONS

Acramatic 8-D System Circuit Diagrams (Nov. 1974).

Primary Examiner—Donald J. Yusko
Assistant Examiner—Michael Krakovsky
Attorney, Agent, or Firm—John W. Gregg

[57] ABSTRACT

Interface circuits for electromagnetic position transducers are provided to reduce the effects of capacitive coupling occurring in the conductive cabling between the position transducers and the associated interfaces located remotely therefrom. Capacitive coupling of excitation signals to the transducer output signals result in error signals appearing as cyclic error in measured positions. The magnitude of the coupled signals are substantially reduced by providing excitation signals symmetrical with respect to ground. The magnitude of the coupled signals are also reduced by presenting equal impedances relative to ground to the output signal return and signal paths. By reducing the effects of capacitively coupled signals, conducting cables for the excitation signals and the transducer output signals may be incorporated in a single shielded cable.

9 Claims, 5 Drawing Sheets

INTERFACE CIRCUITS FOR ELECTROMAGNETIC POSITION TRANSDUCERS

BACKGROUND OF THE INVENTION

I. Field of the Invention

This invention relates generally to apparatus for position measurement. In particular, this invention relates to interface circuits used with electromagnetic position transducers.

II. Description of the Prior Art

Position transducers which are of interest herein include resolvers and slider and scale systems producing AC output signals in response to AC excitation signals wherein a phase shift between the excitation signals and the output signals is introduced by the relative position of a transducer armature and stator. The position of the armature relative to the stator is measured by detecting this phase difference. Two alternative methods are known for detecting the phase difference: a phase discrimination technique wherein the excitation signals are applied to pairs of windings arranged in quadrature, and the position induced phase shift is detected by phase comparison of the output signal with a reference from which the excitation signals are derived; and, an amplitude technique wherein the output signals are produced by the quadrature windings and the position induced phase shift is detected from the ratio of the instantaneous magnitudes of the output signals.

FIG. 1a illustrates an arrangement used with the amplitude technique employing a resolver to measure position of a moveable member of, for example, machine tools, robots or other position controlled equipment. The resolver 10 includes a rotor 12 having an armature coil 14, and a stator having stator coils 16 and 18. The rotor 12 is rotated relative to the stator by, for example, a motor 28. The transducer 10 is located remotely from a control device 20 wherein a drive amplifier 22 produces an AC excitation signal applied to the armature coil 14. Output signals appearing at the stator coils 16 and 18 are returned to differential amplifiers 24 and 26 located in control 20. As shown, the return side of the drive amplifier output is grounded and the receiving amplifiers 24 and 26 present unmatched impedances to the signal and return paths because of the input resistor networks. Conducting cables 30, 32, and 34, typically twisted pairs, provide connection of excitation and output signals between the interface circuits of control 20 and the resolver 10.

FIG. 1b illustrates an arrangement used with the phase discrimination technique employing a resolver to measure position of a moveable member. In this arrangement excitation signals are produced by drive amplifiers 23 and 25 and applied to the resolver stator coils 17 and 19. An output signal appears at resolver armature coil 13 and is returned to differential amplifier 21 in control 19. The excitation signals are derived from a single reference signal and are phased displaced one from the other by $\pi/2$ radians.

FIG. 2 illustrates capacitive coupling between an excitation signal cable and an output signal cable which will exist as a result of proximity of the conducting cables 30, 32 and 34 of FIGS. 1a and 1b. In FIG. 2 capacitors C1, C2, C3, and C4 represent lumped values of the coupling capacitances distributed over the lengths of the conducting cables; source SD represents the source of excitation signals; and, load LD represents the load impedance presented to an output signal. Inductive coupling of the rotor and stator windings is intentionally omitted to simplify the analysis of the capacitive coupling in the conducting cables. It will be appreciated from FIG. 2 that by virtue of the grounded return paths only capacitance C1 contributes an error component to the output signal appearing across the load.

The voltage error component in the output signals arising from capacitive coupling as shown in FIG. 2 has a magnitude equal to the excitation signal magnitude and is phase displaced $\pi/2$ radians therefrom. The current due to this error component is added algebraically to the output signal current magnitude, resulting in a position error repeated over the range of position measured by the resolver. Such errors are referred to as "cyclic errors." It is common practice to provide individual shields for each conducting cable, such as shields 31, 33, and 35 to reduce or eliminate capacitive coupling between the excitation and output signal cables. The cost of such shielding significantly increases the material and labor costs associated with the installation of such cables.

SUMMARY OF THE INVENTION

It is an object of the present invention to provide apparatus for position measurement by electromagnetic position transducers having inherent elimination and reduction of capacitively coupled signals between excitation and output signal conducting cables.

It is a further object of the present invention to provide apparatus for position measurement by electromagnetic position transducers having excitation signals which are symmetrical with respect to ground, thereby providing inherent reduction of a first mode of capacitively coupled signals between excitation and output signal conducting cables.

It is a further object of the present invention to provide apparatus for position measurement by electromagnetic position transducers having balanced signal and return paths for the output signals thereby providing inherent reduction of a second mode of capacitively coupled signals between the excitation and output signal conducting cables.

Other objects and advantages of the present invention shall become apparent from the accompanying drawings and the following description thereof.

In accordance with the aforesaid objects the present invention provides an excitation signal source for use with electromagnetic position transducers producing an AC excitation signal symmetrical with respect to ground. A first AC signal is inverted to produce a second AC signal and the excitation signal is taken as the difference between the first and second AC signals. Further in accordance with the aforesaid objects, a receiver for use with electromagnetic position transducers is provided having matched impedances for signal and return lines of an output signal.

DETAILED DESCRIPTION OF THE PREFERRED EMBODIMENT

To illustrate the invention, electromagnetic position transducer interface circuits of a motor control device developed for Cincinnati Milacron Inc., the assignee of the present invention shall be described in detail. While the interface circuits to be described constitute a preferred embodiment, it is not the intention of applicants to limit the scope of the invention to the details thereof.

Figure 3:
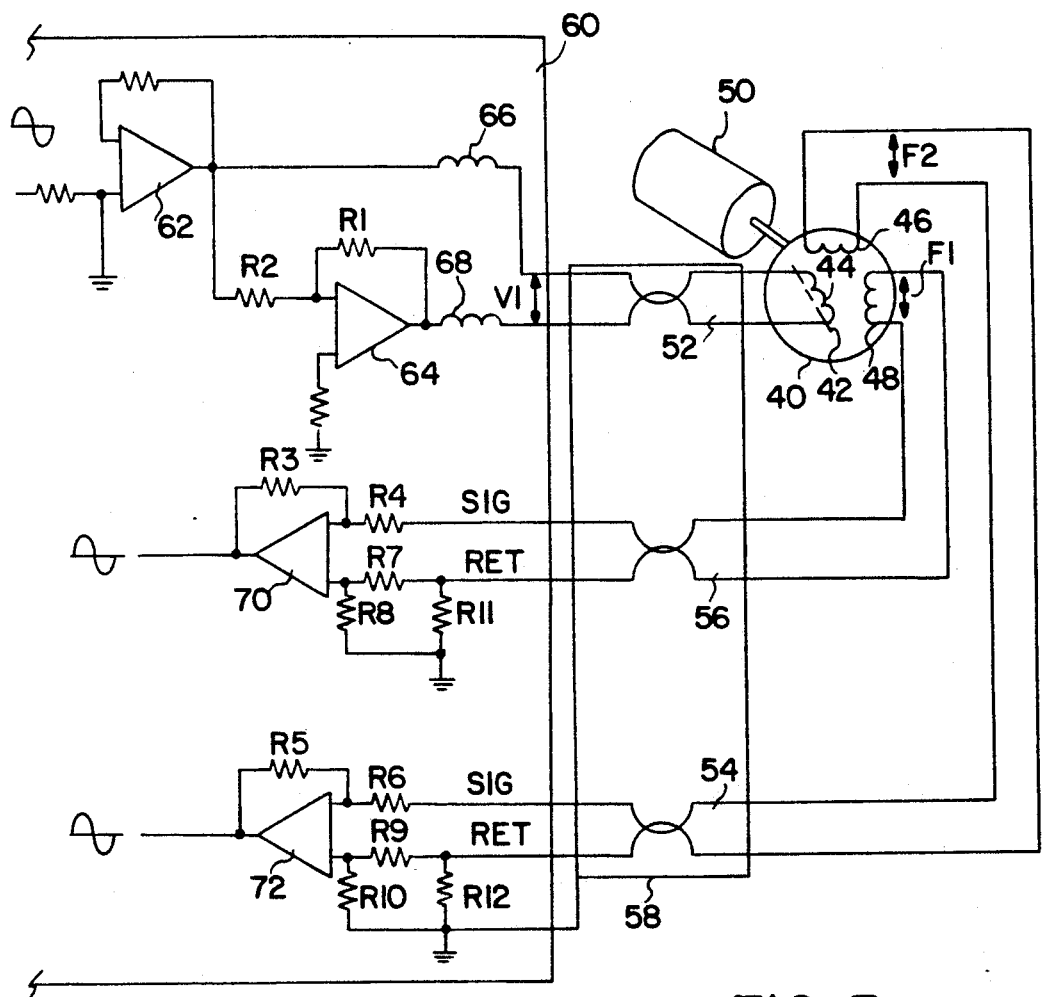
FIG. 3 illustrates circuits of the present invention as applied to a resolver.

Referring to FIG. 3, a resolver 40, mechanically coupled to motor 50, is shown remotely located from motor controller 60. None of the details of motor controller 60 pertaining to control of motor 50 are pertinent to the present invention and these details shall not be described herein. Motor 50, under control of controller 60, effects rotation of rotor 42 relative to a resolver stator. Stator coils 46 and 48 are fixed relative to the resolver stator and produce AC output signals in response to an AC excitation signal impressed on rotor coil 44. The output signals E1 and E2 are expressed as functions of the excitation signal and the relative angular position of the rotor 42 and stator as follows:

$$F1 = E^* \text{sine}(\Theta)^* \text{sine}(Wt)$$

$$F2 = E^* \text{cosine}(\Theta)^* \text{sine}(Wt)$$

Where:
  E = magnitude of the excitation signal
  $\Theta$ = relative angular position of the resolver rotor and stator in radians
  W = the frequency of the excitation signal in radians
  t = time Although shown directly applied to the rotor coil 44, the excitation signal may in fact be inductively coupled thereto from the stator in brushless resolvers. In either case, the signal and return paths of the excitation signal are provided by twisted pair conductor cable 52. The signal and return paths for the output signals F1 and F2 are provided in, respectively, twisted pair conductor cables 54 and 56. By virtue of the symmetrical excitation signal and the symmetrical impedance of the output signal receivers provided by the circuitry of the present invention, capacitive coupling between the excitation and output signals is inherently eliminated and all of the twisted pair conductor cables may be advantageously enclosed by a single shield 58.

Continuing with reference to FIG. 3, it is seen that the excitation signal V1 is taken across the outputs of amplifiers 62 and 64. Amplifier 62 receives a sinusoidal AC signal S1 of constant frequency W derived from a square wave. The output of amplifier 62 is inverted by amplifier 64. Series inductors 66 and 68 are provided to reduce the possibility of high frequency oscillation appearing at the outputs of amplifiers 62 and 64 when connected to cables presenting relatively high capacitive loads. Gain setting resistors R1 and R2 are of equal value within a moderately close tolerance as may be readily achieved, for example, using 1% components. The excitation signal V1 is symmetrical about ground due to the inversion of the output of amplifier 62 by amplifier 64.

Figure 4A:
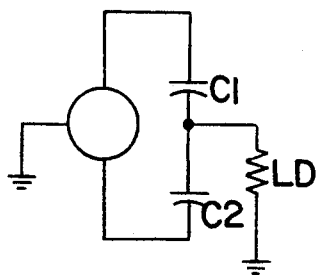
FIGS. 4a, 4b and 4c are equivalent circuits illustrating the effects of the circuits of FIG. 3 on the capacitive coupling illustrated by FIG. 2.

The effect of providing an excitation signal symmetrical with respect to ground in combination with the prior art receiving circuits is illustrated by the equivalent circuit of FIG. 4a. With the return path grounded at the receiver, the signals coupled by capacitances C4 and C3 do not appear in the output signal and these capacitances do not appear in the equivalent circuit. The remaining capacitances C1 and C2 couple the excitation signal to the output signal producing an error component having a magnitude expressed as a function of the excitation signal magnitude as follows:

$$V_{CA} = E^*(C1 - C2)/(C1 + C2)$$

Continuing with reference to FIG. 3, output signals F1 and F2 are received by differential amplifiers 70 and 72 which amplify the potential difference appearing across the signal and return paths of the twisted pair conductor cables 56 and 54. The use of differential amplifiers provides high rejection of noise signals common to the amplifier inputs. Gain determining components R4, R7, and R6, R9 are chosen to have equal values within a component tolerance of 0.1% to facilitate analogue to digital conversion with an accuracy of 12 binary digits. Gain determining components R8 and R3 of amplifier 70 and resistors R10 and R5 of amplifier 72 are also chosen to be equal within a component tolerance of 0.1%.

To balance the apparent impedances presented to the signal and return paths at the inputs of motor controller 60, impedance matching resistors R11 and R12 are connected between the return path input and ground at respectively, amplifier 70 and amplifier 72. The resistor R11 has a value equal to half the product of the sum of the values of resistors R7 and R8 multiplied by the ratio of R7 to R8 and the resistor R12 has a value equal to half the product of the sum of the values of resistors R9 and R10 and the ratio of R9 to R10.

Figure 1A:
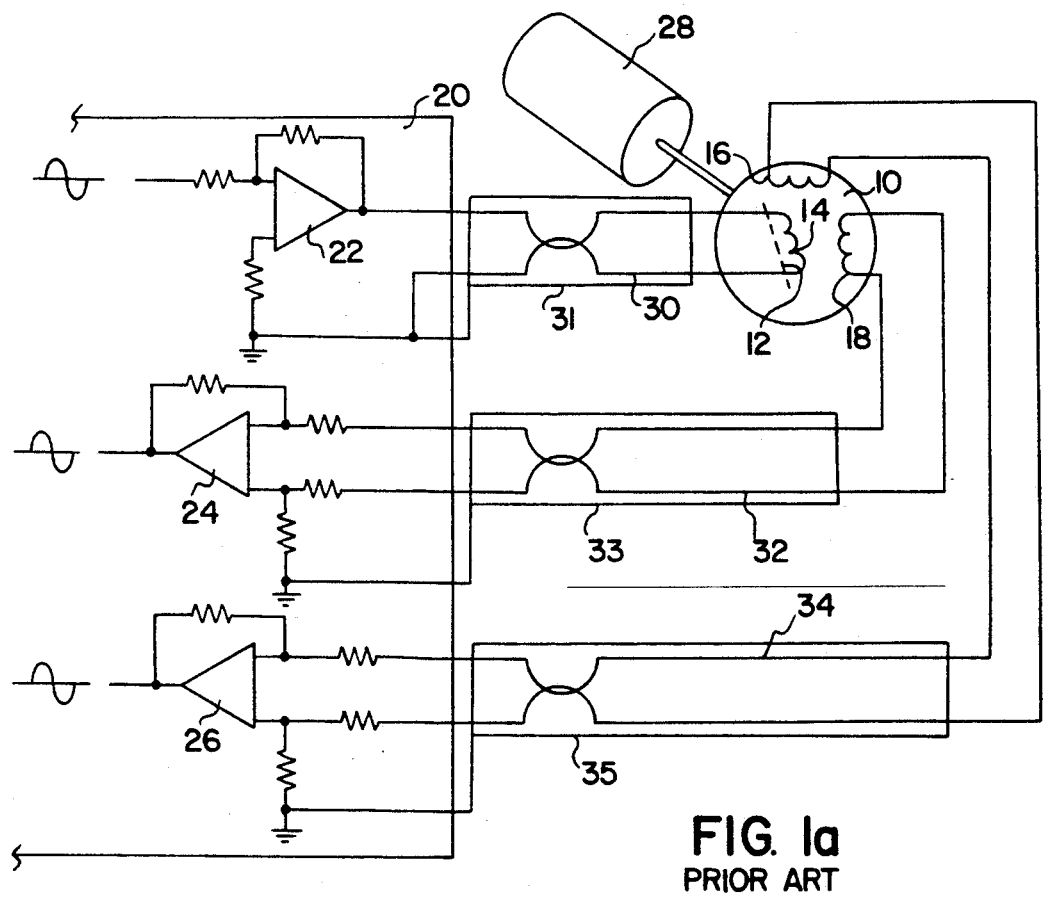
FIGS. 1a and 1b illustrate prior art circuits for position measurement using a resolver.
Figure 1B:
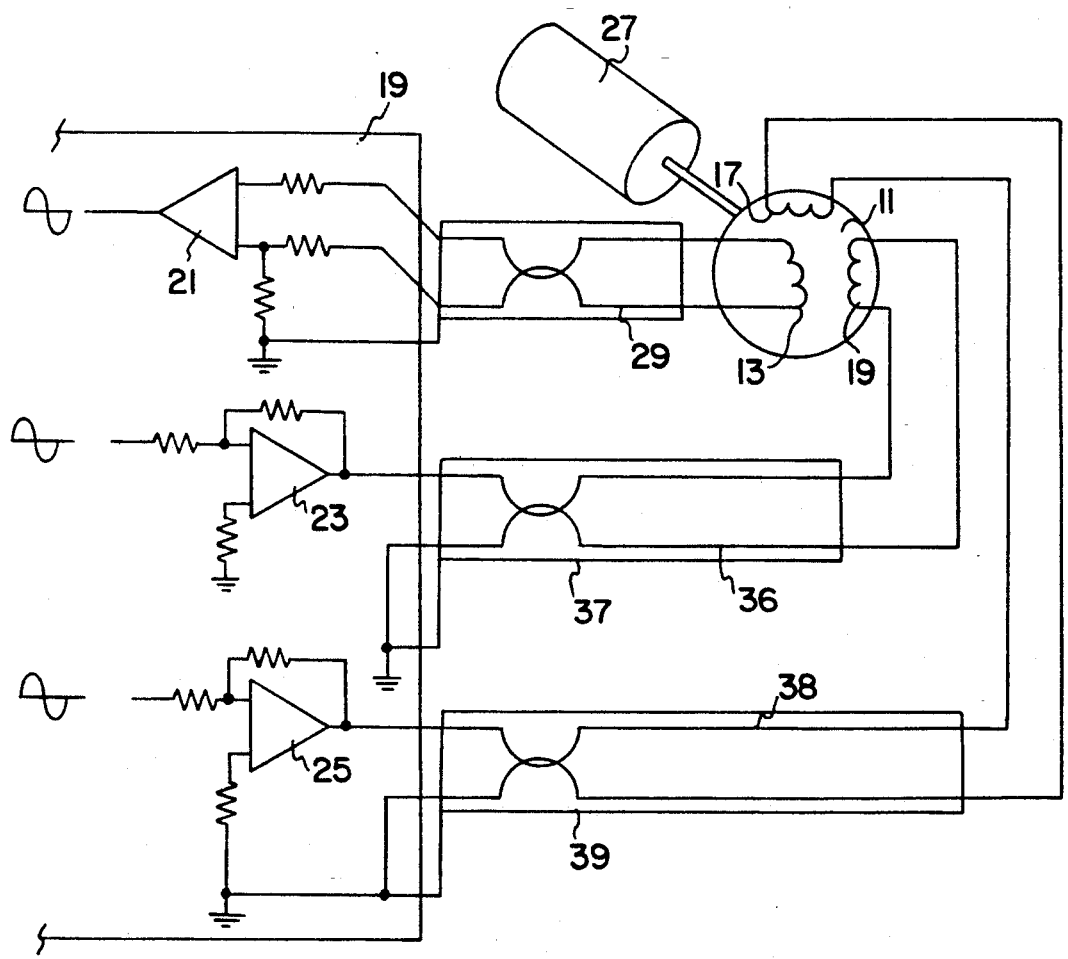
Figure 2:
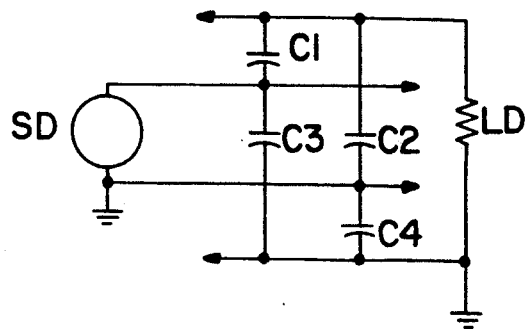
FIG. 2 illustrates capacitive coupling between excitation and output signal conducting cables.
Figure 4B:
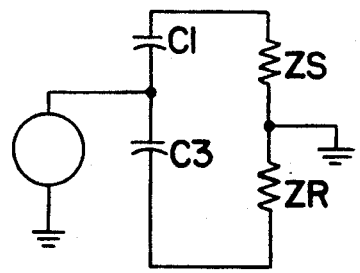

The effect of providing matched impedances to the signal and return lines in combination with an unsymmetrical excitation signal of the prior art is illustrated by the equivalent circuit of FIG. 4b. In this circuit one side of the source is grounded. The contribution to the error component of the output signal from capacitances C2 and C4 of FIG. 2 is therefor null and these capacitances do not appear in the equivalent circuit. The magnitude of the error component of the output signal contributed by the remaining capacitances C1 and C3 is expressed as a function of the excitation signal magnitude as follows:

$$V_{CB} = E^*(C1 - C3)/(C1 + C3)$$

Figure 4C:
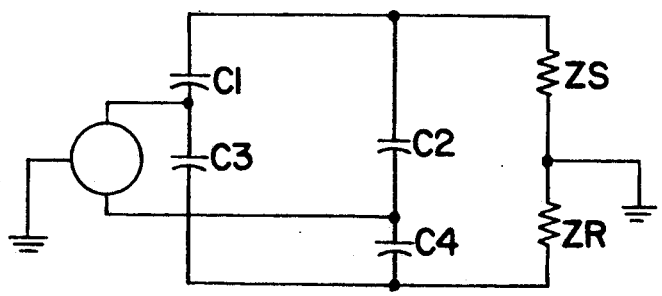

The combined effect of providing an excitation signal symmetrical with respect to ground and matched impedances of the signal and return lines at the output signal receivers is illustrated by the equivalent circuit of FIG. 4c. The magnitude of the error component of the output signals contributed by the capacitive coupling is expressed as a function of the excitation signal magnitude E as follows:

$$V_{CC} = E^*(C1 + C4 - C2 - C3)/(C1 + C2 + C3 + C4)$$

From the equivalent circuits of FIGS. 4a, 4b, and 4c and the analysis of the magnitude of the error component associated with the resultant capacitive coupling, it is apparent that the error component is eliminated in cases where $C1=C2=C3=C4$. In cases where these capacitances are not equal, the magnitude of the error component is substantially reduced, permitting the elimination of the individual shields intended to otherwise reduce the effects of capacitive coupling between the excitation signal and output signal conducting cables. It is also apparent that substantial reduction of the error component magnitude is achieved by use of either an excitation signal symmetrical with respect to ground or matched impedances in the signal and return lines of the output signal.

Figure 5:
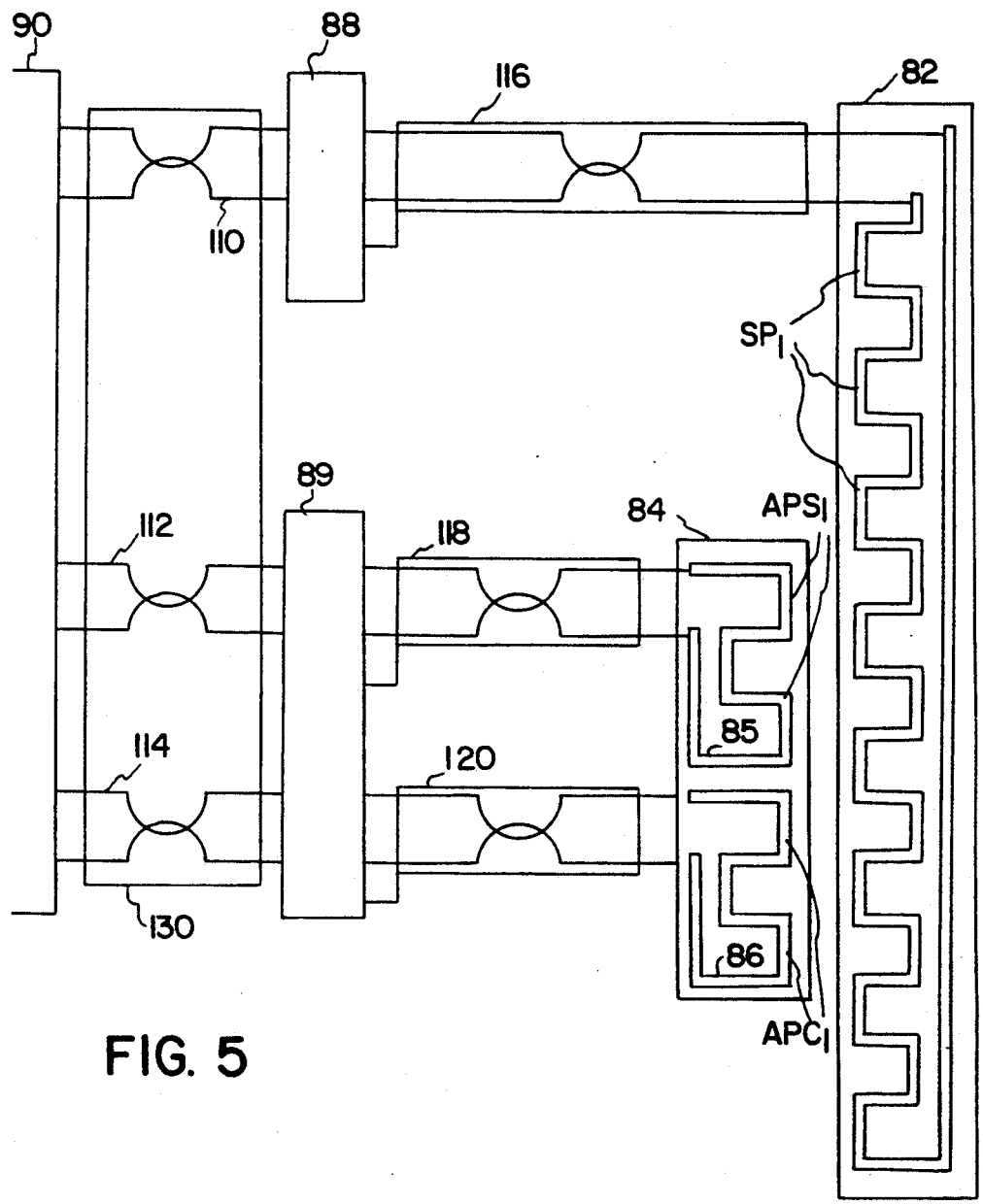
FIG. 5 illustrates circuits of the present invention as applied to a slider and scale system.

FIG. 5 shows the use of a symmetrical excitation signal and balanced impedance receivers for the output signals as applied to a slider and scale measuring system 80. A scale excitation signal output by scale amplifier 88 is applied to a scale 82. Scale 82 has a formed conductor defining pole segments $SP_I$ having a pitch I. Slider output signals are induced in slider formed conductors 85 and 86 by the scale excitation signal. The slider formed conductors 85 and 86 define pole segments $APS_I$ and $APC_I$ having the same pitch I as the scale pole segments. The slider pole segments are arranged relative to one another so as to be spatially separated by I/4. The slider output signals are transmitted to line amplifiers 89 proximate the slider 84 via conducting cables 118 and 120. Line amplifiers 89 produce AC output signals which are transmitted to control 90 via conducting cables 112 and 114. An excitation signal generated at control 90 is transmitted to scale amplifier 88 proximate the scale 82 via conducting cable 110. Scale amplifier 88 produces the scale excitation signal conducted by cable 116 to scale 82.

Relative position of the slider 84 and scale 82 may be determined from the slider output signals using the amplitude technique described for use with resolvers. Because of the low impedance of the interface between the slider and scale system and of the amplifiers 88 and 89, capacitive coupling between the scale excitation signal and the slider output signals does not generally give rise to an appreciable error component in the measured position. Conversely, the interface between the control 90 and the amplifiers 88 and 89 is susceptible to the same capacitive effects discussed with reference to FIG. 2. Therefor, the use of an excitation signal symmetrical with respect to ground and matched impedances in the signal and return lines of the output signals provide the same advantages as previously discussed thereby permitting the inclusion of cables 110, 112 and 114 within a single shield 130. The circuits of control 90 used in this application are the same as shown in FIG. 3.

While the invention has been disclosed by reference to the preferred embodiments, and the preferred embodiments have been described in considerable detail, it is not the intention of applicants to limit the invention to such details. Rather, it is intended that the scope of the invention be defined by the appended claims and all equivalents thereto.

What is claimed is:

1. In an apparatus for position measurement by an electromagnetic position transducer effecting phase shift between excitation signals and AC output signals produced in response thereto, the phase shift corresponding with the relative position of a transducer armature and stator, the transducer being remote from interface circuits and connected therewith by conducting cables, the interface circuits including an excitation signal source and output signal receivers, each receiver being connected to a signal path and a return path of an output signal, and wherein the proximity of the conducting cables along their length capacitively couple signals from one conductor to another, the improvement comprising output signal receiving means wherein the return path of each output signal consists of a path from ground having an impedance equal to the impedance presented to the corresponding signal path.

2. In an apparatus for position measurement wherein conducting cables convey signals between an electromagnetic position transducer and interface circuits remote therefrom, the position transducer effecting phase shift between excitation signals and output signals in accordance with the relative position of a transducer armature and stator, the interface circuits including an excitation signal source and output signal receivers, and wherein the proximity of the conducting cables along their length capacitively couple signals from one conductor to another, the improvement comprising excitation signal producing means producing excitation signals symmetrical with respect to ground and including a first amplifying means for amplifying a first sinusoidal signal and a second amplifying means for inverting the first sinusoidal signal to produce a second sinusoidal signal antiphase relative the first sinusoidal signal, the excitation signal being taken as the potential difference between the first and second sinusoidal signals.

3. In an apparatus for position measurement wherein conducting cables connect an electromagnetic position transducer and associated interface circuits remote therefrom, the position transducer effecting phase shift between excitation signals and output signals in accordance with the relative position of a transducer armature and stator, and wherein the proximity of the conducting cables along their length capacitively couple signals from one conductor to another, the improvement comprising:
   a. excitation signal producing means producing AC excitation signals symmetrical with respect to ground; and
   b. transducer output signal receiving means including a signal path and a return path for each transducer output signal wherein the return path consists of a path from ground having an impedance to ground equal to the impedance presented by the receiving means in a signal path of the same output signal.

4. The apparatus of claim 3 wherein the excitation signal producing means further comprises:
   a. a first amplifying means for producing a first sinusoidal signal; and
   b. a second amplifying means for inverting the first sinusoidal signal to produce a second sinusoidal signal anti-phase relative the first sinusoidal signal, the excitation signal being taken as the potential difference between the first and second sinusoidal signals.

5. An apparatus for position measurement comprising:
   a. an electromagnetic position transducer having an armature and a stator for resolving a sinusoidal excitation signal into first and second sinusoidal output signals having a predetermined phase difference relative to one another and having a common phase difference from the excitation signal determined by the relative position of the armature and stator;
   b. interface circuits remote from the position transducer and including a source of excitation signals and receiving means for output signals, the receiving means including differential amplifying means for each output signal pair, the differential amplifying means having first and second inputs and an output, the first input including a feedback path from the output and the second input including a path from ground having an impedance equal to the impedance presented by the first input; and c. connecting cables for conveying signals between the interface circuits and the position transducer, whereby the apparent impedances to ground presented to the signal and return paths of each of output signal pair are equal.

6. The apparatus of claim 5 wherein the excitation signal source further comprises an AC excitation signal producing means providing an AC excitation signal being symmetrical with respect to ground.

7. The apparatus of claim 6 wherein the AC excitation signal producing means further comprises:
   a. a first amplifying means for producing a first AC signal; and
   b. a second amplifying means for inverting the first AC signal to produce a second AC signal anti-phase relative the first AC signal, the excitation signal being taken as the potential difference between the first and second AC signals.

8. An apparatus for position measurement comprising:
   a. an electromagnetic position transducer having an armature and a stator for resolving a sinusoidal excitation signal into first and second sinusoidal output signals having a predetermined phase difference relative to one another and having a common phase difference from the excitation signal determined by the relative position of the armature and stator;
   b. interface circuits remote from the position transducer and including a source of excitation signals and receiving means for the output signals, the excitation signal source providing an AC excitation signal being symmetrical with respect to ground and including a first amplifying means for amplifying a first sinusoidal signal and a second amplifying means for inverting the first sinusoidal signal to produce a second sinusoidal signal anti-phase relative the first sinusoidal signal, the excitation signal being taken as the potential difference between the first and second sinusoidal signals; and
   c. connecting cables for conveying signals between the interface circuits and the position transducer.

9. The apparatus of claim 8 wherein the receiving means further comprises a differential amplifying means for each output signal pair, the differential amplifying means having first and second inputs and an output, the first input including a feedback path from the output and the second input including a path from ground having an impedance equal to the impedance presented by the first input, whereby the apparent impedances to ground presented to the signal and return paths of each output signal pair are equal.

* * * * *